United States Patent [19]

Brown et al.

[11] Patent Number: 5,302,103
[45] Date of Patent: Apr. 12, 1994

[54] INJECTION MOLDING MACHINE INCLUDING QUICK-CHANGE MOLD ASSEMBLY

[75] Inventors: Robert L. Brown, Hartville; Todd A. England, North Canton; Edward F. Huff, Wadsworth, all of Ohio

[73] Assignee: GenCorp Inc., Fairlawn, Ohio

[21] Appl. No.: 774,772

[22] Filed: Oct. 10, 1991

[51] Int. Cl.⁵ ............................................. B29C 45/80
[52] U.S. Cl. .................................... 425/150; 425/190; 425/192 R; 425/574; 425/575
[58] Field of Search .................. 425/97, 98, 253, 254, 425/143, 406, 408, 411, 432, 589, 150, 185, 190, 192 R, 574, 575

[56] References Cited

U.S. PATENT DOCUMENTS

| | | | |
|---|---|---|---|
| 3,156,014 | 11/1964 | Wenger | 425/589 |
| 3,277,551 | 10/1966 | Sekiguchi | 425/253 |
| 3,746,488 | 7/1973 | Messenger | 425/195 |
| 4,195,048 | 3/1980 | Jung | 264/40.1 |
| 4,202,522 | 5/1980 | Hanas et al. | 425/185 |
| 4,348,165 | 9/1982 | Vostrovsky | 425/185 |
| 4,472,127 | 9/1984 | Cyriax et al. | 425/183 |
| 4,473,346 | 9/1984 | Hehl | 425/183 |
| 4,500,274 | 2/1985 | Cyriax et al. | 425/185 |
| 4,500,275 | 2/1985 | Ruhl | 425/192 R |
| 4,505,661 | 3/1985 | Biefeldt | 425/190 |
| 4,518,337 | 5/1985 | Tribbett | 425/406 |
| 4,529,371 | 7/1985 | Nickley | 425/186 |
| 4,544,340 | 10/1985 | Hehl | 425/589 |
| 4,555,228 | 11/1985 | Nishiike et al. | 425/185 |
| 4,643,663 | 2/1987 | Bowles | 425/406 |
| 4,655,275 | 4/1987 | Wörner | 164/341 |
| 4,671,764 | 6/1987 | Hehl | 425/595 |
| 4,710,121 | 12/1987 | Hehl | 425/190 |
| 4,714,421 | 12/1987 | D'Agostino | 425/192 |
| 4,798,528 | 1/1989 | Hattori et al. | 425/190 |
| 4,810,182 | 3/1989 | Groll | 425/190 |
| 4,828,478 | 5/1989 | Hehl | 425/190 |
| 4,861,254 | 8/1989 | Takeuchi | 425/190 |
| 4,867,666 | 9/1989 | Brizio et al. | 425/190 |
| 4,913,912 | 4/1990 | Leverenz | 425/549 |
| 4,929,166 | 5/1990 | DiSimone et al. | 425/190 |
| 4,950,154 | 8/1990 | Moberg | 425/589 |
| 4,976,602 | 12/1990 | Yamazaki | 425/589 |
| 5,063,648 | 11/1991 | Yonezawa et al. | 425/190 |
| 5,114,329 | 5/1992 | Nakamura et al. | 425/190 |

OTHER PUBLICATIONS

European Search Report EP 92 30 766 2.

*Primary Examiner*—Tim Heitbrink

[57] ABSTRACT

An injection molding machine having a machine frame, an injection assembly coupled with the frame, a press assembly also coupled with the frame, a mold-mounting assembly coupled with the press assembly, and a mold pallet assembly secured to the press assembly by the mold mounting-assembly. The mold pallet assembly includes first and second mold pallet units which define a mold cavity when they are placed in a closed condition. The mold pallet assembly further includes alignment members which ensure correct alignment between the first and second mold pallet units when in a closed condition. The first mold pallet unit includes an injection assembly for engagement with the injection assembly. The mold-mounting assembly includes first and second mold-mounting devices, securing the first and second mold pallet units, respectively, to the press assembly. The mold-mounting assembly further includes a sensor which indicates the correct alignment of the mold pallet assembly relative to the press assembly. The press assembly moves the first and second mold pallet units between a closed condition and an open condition in which they are separated from each other. Movement of the first mold pallet unit by the press assembly engages the unit with the injection assembly.

11 Claims, 6 Drawing Sheets

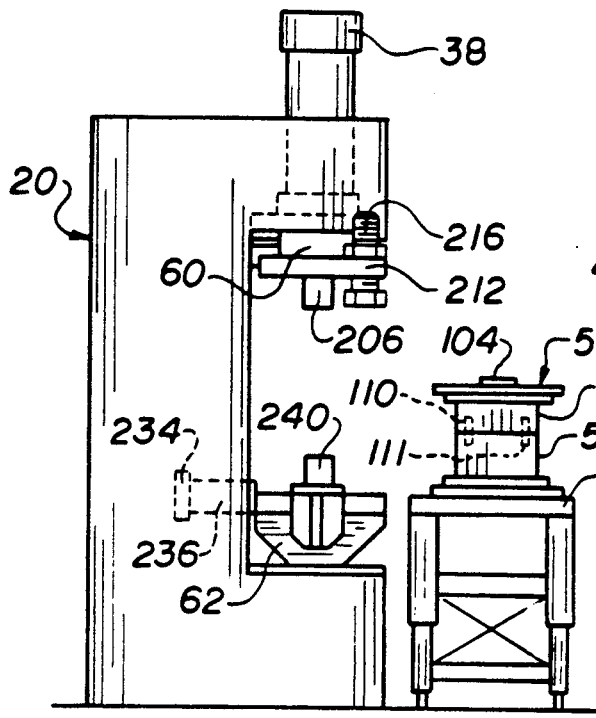
FIG. 2A1
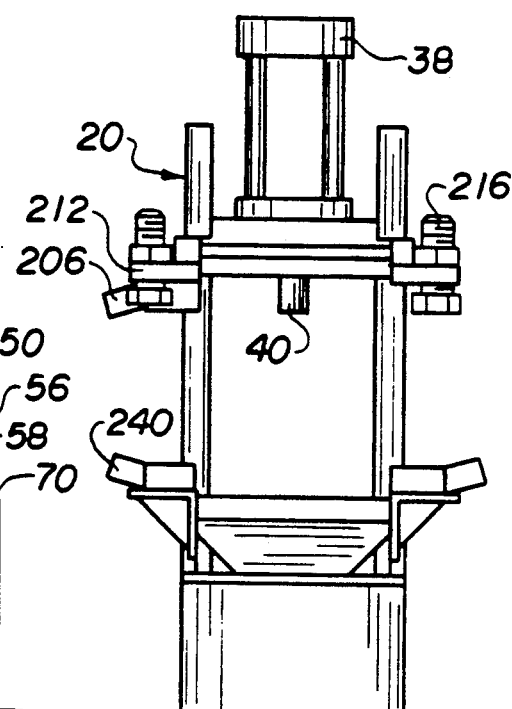
FIG. 2A2
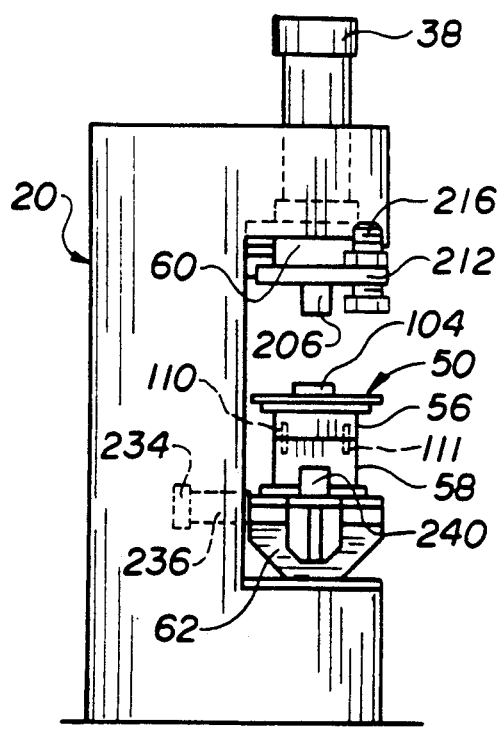
FIG. 2B1
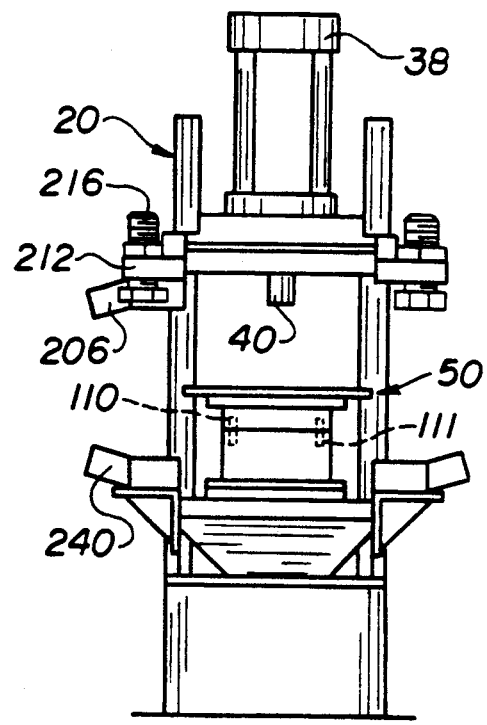
FIG. 2B2

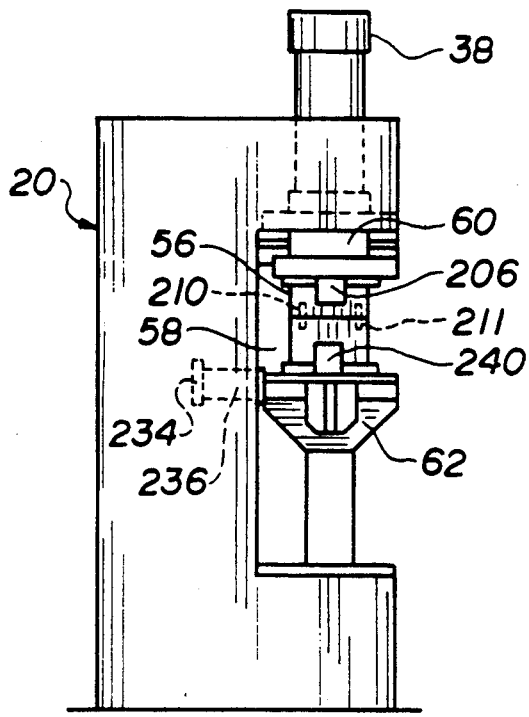
FIG. 2C1
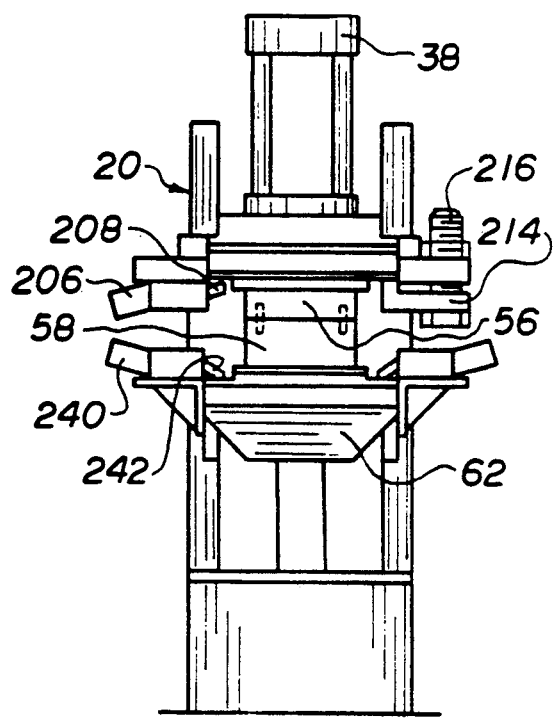
FIG. 2C2
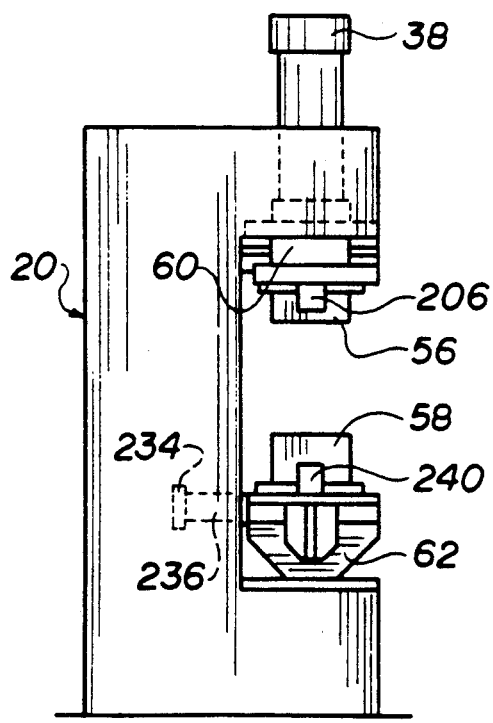
FIG. 2D1
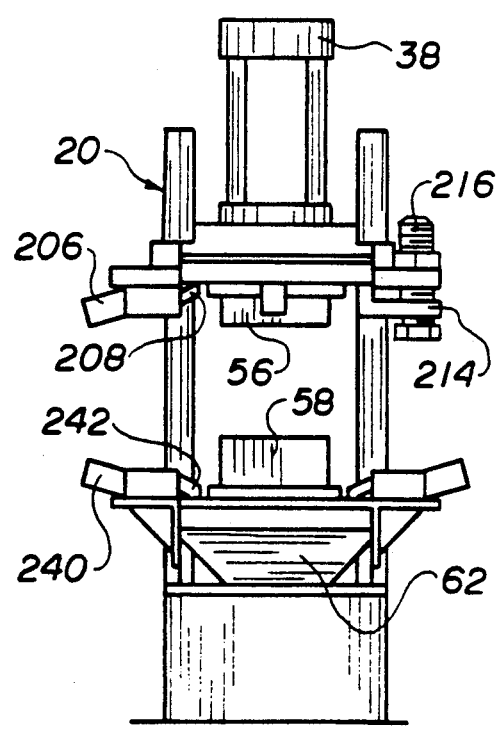
FIG. 2D2

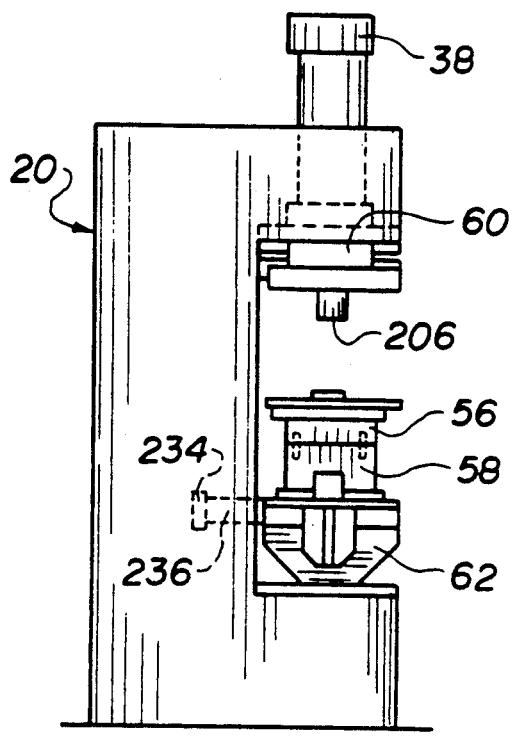
FIG. 2E
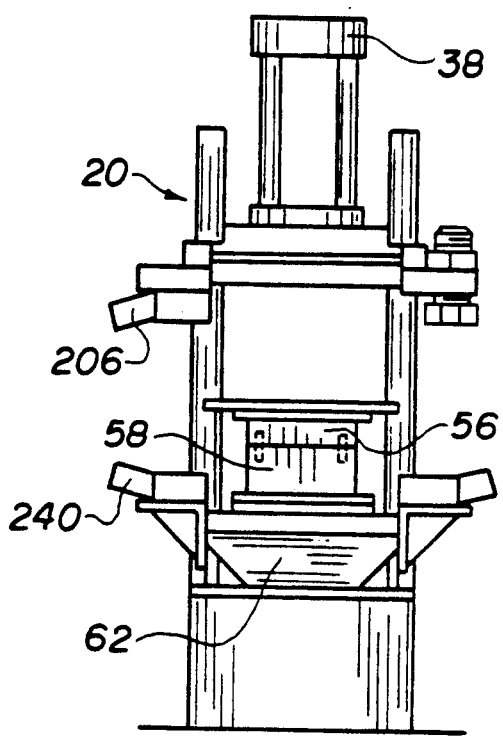
FIG. 2F
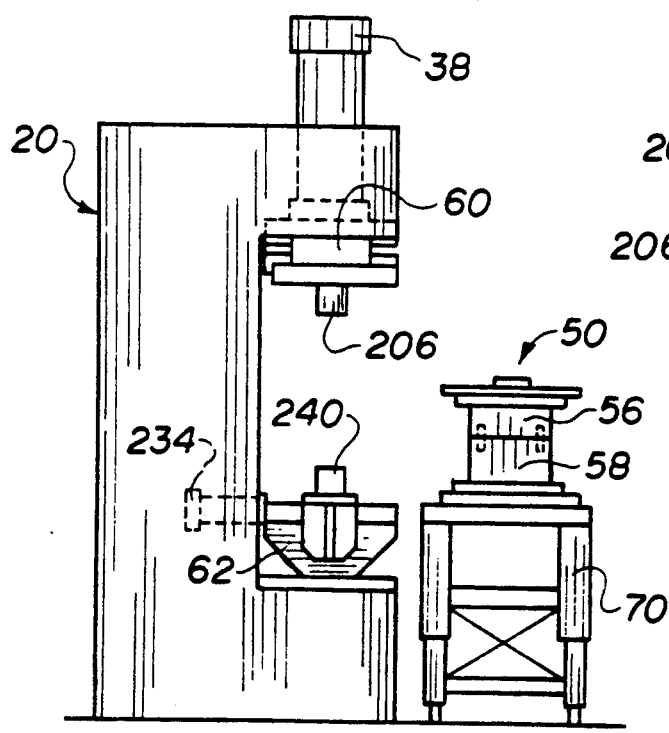
FIG. 2G1
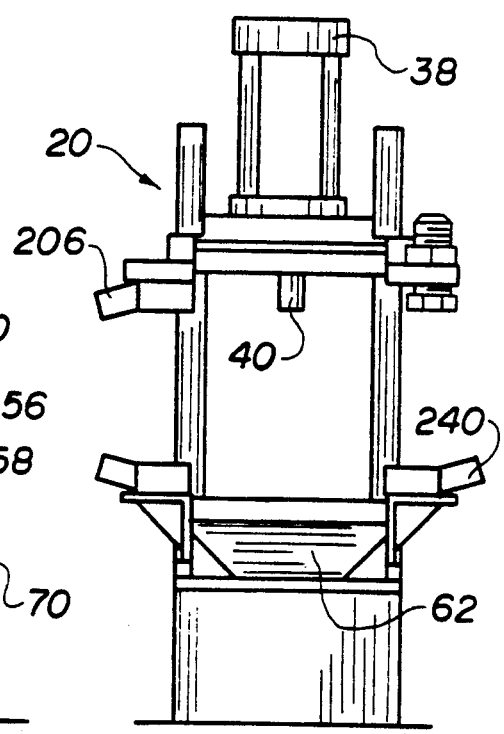
FIG. 2G2

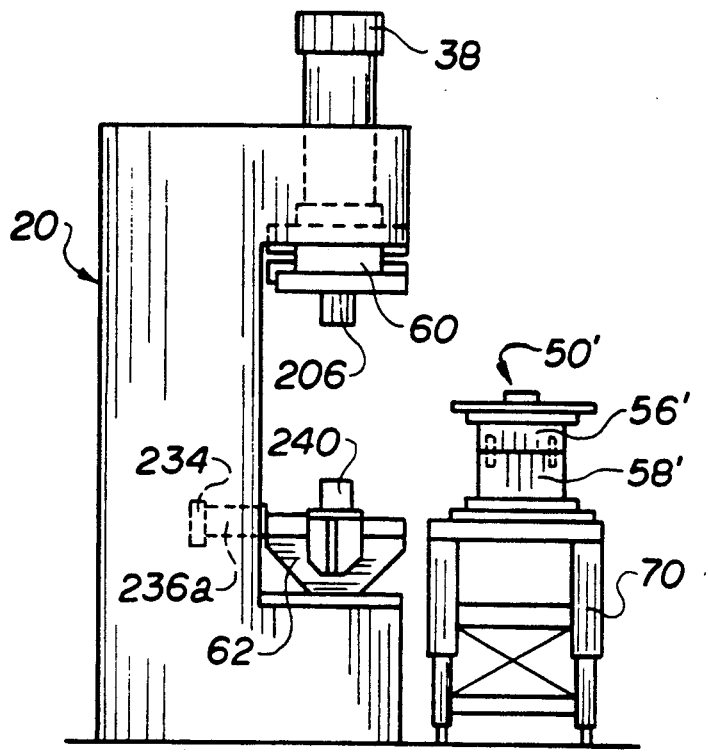
FIG. 2H1
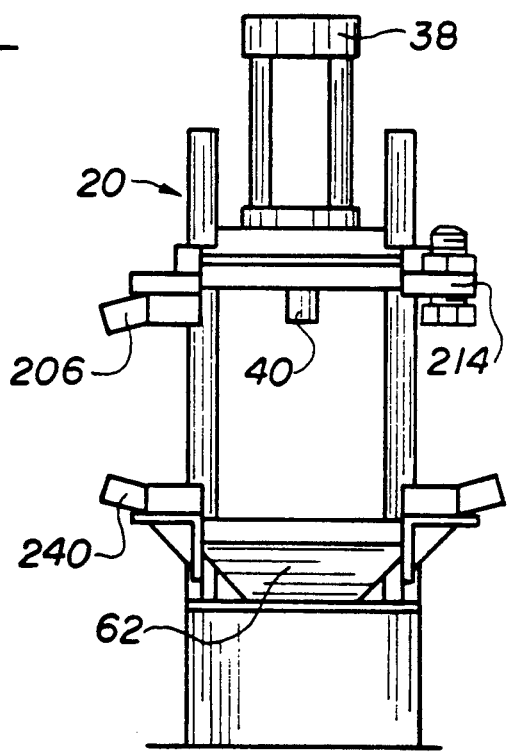
FIG. 2H2

INJECTION MOLDING MACHINE INCLUDING QUICK-CHANGE MOLD ASSEMBLY

FIELD OF THE INVENTION

This invention relates to an injection molding machine including quick-change mold mounting features.

BACKGROUND OF THE INVENTION

The operational components of a typical injection molding machine are designed to transform stock material into a batch of molded products. A "batch" is a predetermined number of essentially identical molded products which are manufactured during single or multiple production runs. The operational components of an injection molding machine usually include a stock supply assembly, an extruder assembly, an injection assembly, a press assembly and a mold pallet assembly.

In many industrial settings, it is desirable for a single injection molding machine to produce several different batches of molded products. During a typical multi-batch manufacturing shift, a first batch of molded products is created during a first production run. To begin this first production run, a first mold pallet assembly, which contains a "mold profile" reflecting the desired shape of the first batch of molded products, is installed into the machine and properly coordinated with the other assemblies of the machine.

At the completion of the production run, a second batch of molded products may be created. In a multibatch manufacturing shift, this second batch of molded products will possess properties different from those of the first batch of molded products. Consequently, in a batch-conversion it is necessary to remove the first mold pallet assembly and replace it with a second mold pallet assembly.

SUMMARY OF THE INVENTION

The present invention provides an injection molding machine which allows batch-conversions to be performed without significant machine downtime and/or the use of specialized tools. While in the past, a batch-conversion would usually take between fifteen to forty-five minutes, the present invention is believed to be capable of performing a batch-conversion in one to three minutes. Additionally, the present invention eliminates the need for using hand tools. The use of specialized hand tools has previously required highly skilled operators to perform a mold conversion. The elimination of such hand tools enables less skilled employees to operate the present invention.

The present invention more particularly provides an injection molding machine including a frame, an injection assembly coupled to the frame, a press assembly also coupled to the frame, a mold-mounting assembly coupled with the press assembly, and a mold pallet assembly adapted to be mounted to the press assembly by the mold-mounting assembly. Although operation of the present invention may be manually controlled, a control system may also be provided to coordinate movement of components of the invention, as well as the desired operating parameters of the components.

The mold pallet assembly includes a first mold pallet unit and a second mold pallet unit which define a mold cavity when they are placed in a closed condition. The mold pallet assembly further includes alignment members which ensure correct alignment between the first and second mold pallet units when they are placed in the closed condition. The first mold pallet unit includes an injection-interfacing member for interfacing with the injection assembly.

The mold-mounting assembly includes a first mold-mounting device and a second mold-mounting device which are designed to couple the first and second mold pallet units respectively, to the press assembly. The mold-mounting assembly further includes a position sensor which indicates the correct alignment of the mold pallet assembly relative to the press assembly. The press assembly moves the first and second mold pallet units between an open condition in which they are separated from each other and a closed condition in which they define a mold cavity. Movement of the press assembly also enables engagement of the injection assembly with the first mold pallet unit when the mold pallet assembly is in closed condition.

Other features and advantages will become apparent from the detailed description of the present invention made with reference to the accompanying drawings, which form a part of the specification.

BRIEF DESCRIPTION OF THE DRAWINGS

FIGS. 2A-2H are schematic views of the injection molding machine in various stages of a typical operational sequence, the figure numbers with the suffix "1" referring to side views of the machine and the figures with a suffix "2" referring to corresponding front views of the machine.

DETAILED DESCRIPTION

Figure 1:
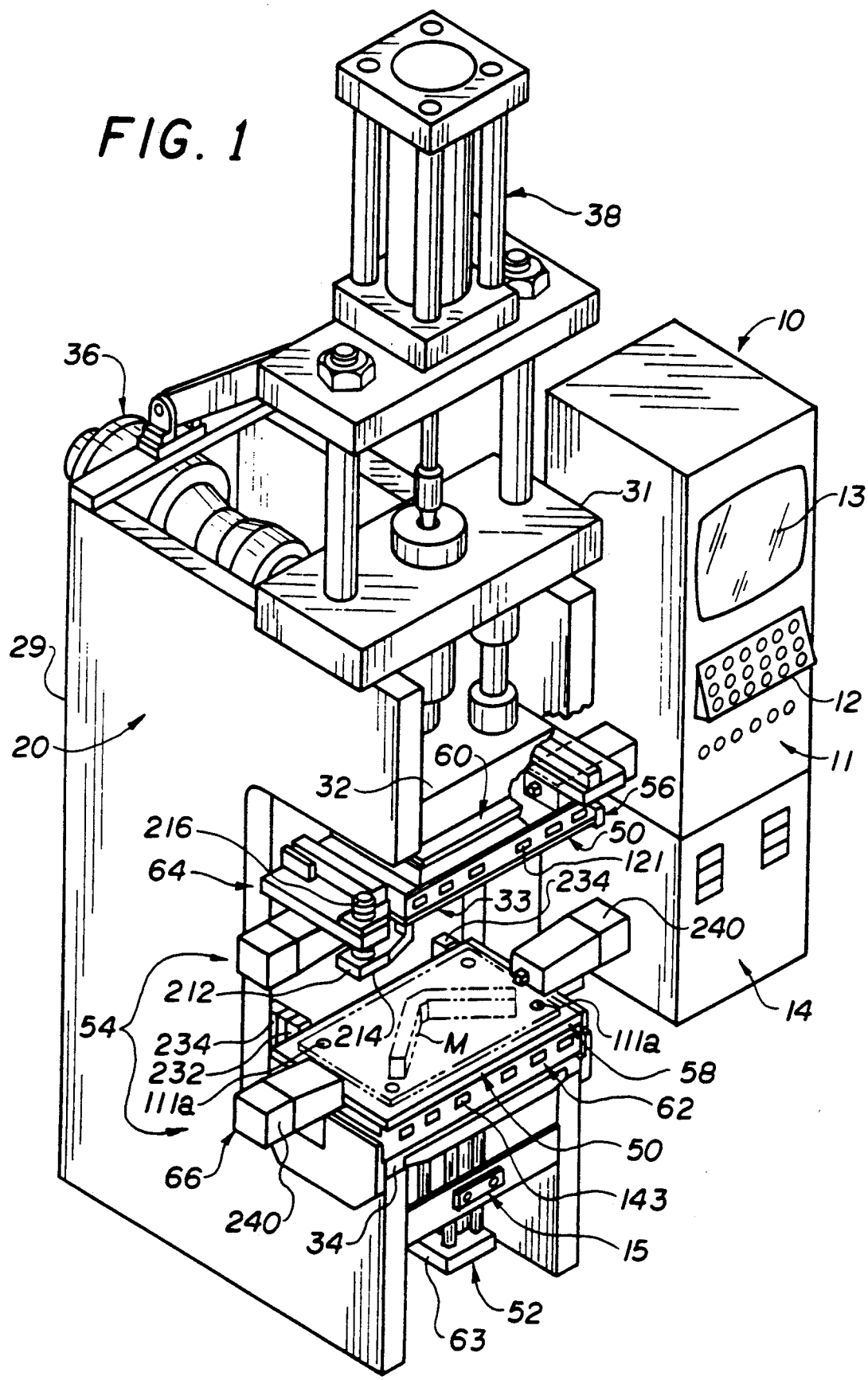
FIG. 1 is a perspective schematic view of an injection molding machine according to the present invention.

Referring now to the drawings in detail, and initially to FIG. 1, an injection molding machine for manufacturing molded products M according to the present invention is indicated generally at 20. The injection molding machine 20 comprises a generally C-shaped frame 29. The frame 29 includes two vertical side plates 30 and horizontal plates 31, 32, 34 interconnecting the side plates. The horizontal and vertical plates form a molding station 33 within two of the plates 32, 34 and the C-shaped cut-outs of the C-shaped frame 29. The operational components of the machine 20 are coupled, either directly or indirectly, to the frame 29.

The operational components of the injection molding machine 20 include a stock supply assembly (not specifically shown), a screw extruder assembly indicated generally at 36, and an injection assembly indicated generally at 38 which includes a conventional hydraulic cylinder for injection of the molding material. In the preferred embodiment, the injection molding machine is a 25 ton injection molding press manufactured by Sanyu of Japan. However, the machine may be any of a number of commercially available or modified machines.

Figure 3:
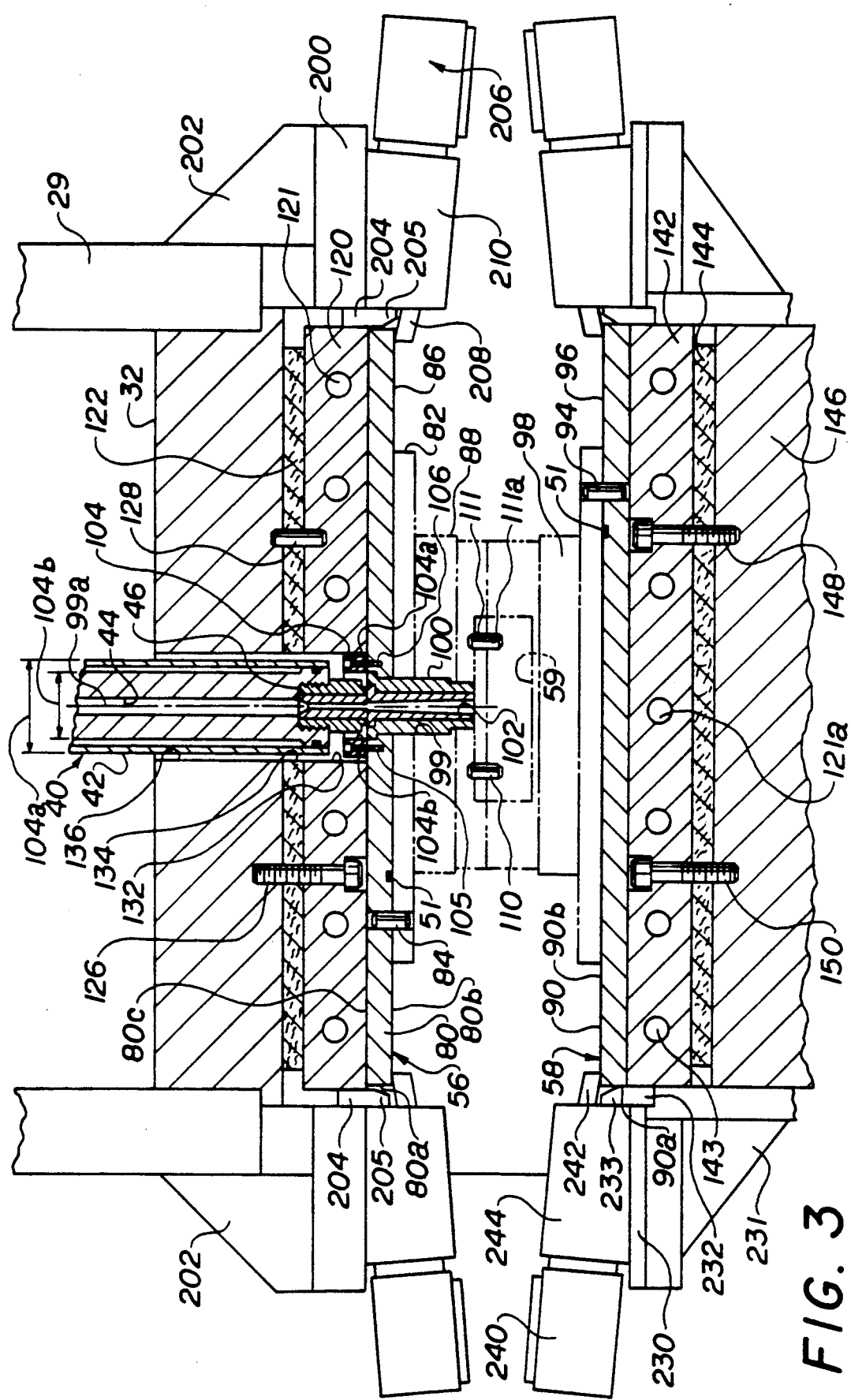
FIG. 3 is an enlarged sectional view of certain components of the injection molding machine.

A computer control system 10 is also included, which includes a programmable computer 11 having an operator control panel 12 and a display panel 13, lift controls 15, and an hydraulic unit 14 which activates various components of the machine 20 during operation. The stock supply assembly, the extruder assembly 36, and the injection assembly 38 may also be of a conventional construction which are well known to one of ordinary skill in the art and thus, are not discussed in great detail here. However, it is noted that the injection assembly 38 includes an injection nozzle unit which is indicated generally at 40, and more specifically described in co-pending, commonly assigned U.S. application Ser. No. 07/751,353. As shown in FIG. 3, the injection nozzle unit 40 includes a cylindrical housing 42 having a bore therethrough defining a central injection passageway 44. The housing 42 is coupled to the injection nozzle 46, and the injection passageway 44 continues therethrough.

The operational components of the injection molding machine 20 further include a mold pallet assembly which is indicated generally at 50, a press assembly which is indicated generally at 52, and a mold-mounting assembly which is indicated generally at 54. Portions of the press assembly 52 are coupled to the machine frame 29, the intermediate horizontal plate 32, and to the lower horizontal plate 34. The mold-mounting assembly 54 is coupled to the press assembly 52, and the mold pallet assembly 50 is adapted to be coupled to the press assembly 52 by the mold-mounting assembly 54.

The mold pallet assembly 50 comprises a first mold pallet unit which is indicated generally at 56 and a second mold pallet unit which is indicated generally at 58. When placed in a closed condition, the mold pallet units 56, 58 define a mold cavity 59, as shown in FIG. 3. The press assembly 52 is adapted to move the first and second mold pallet units 56 and 58, when mounted thereto by the mold-mounting assembly 54. The pallet units are movable between an open condition and a closed condition. In the open condition, the mold pallet units 56 and 58 are vertically spaced from one another. In the closed condition, the units are engaged together to form the mold cavity 59.

The press assembly 52 includes an upper or first support which is indicated generally at 60 and a lower or second support which is indicated generally at 62. The upper support 60 is secured to the frame 29. Thus, when the upper mold pallet unit 56 is secured to the upper support 60, the upper mold pallet unit 56 remains stationary relative to the machine frame 29. The second mold pallet unit 58 is secured to the lower support 62, such that movement of the lower support 62 results in movement of the second pallet unit 58 relative to the machine frame 29. The lower support 62 is operative to move in a preferably vertical travel path between an unloading/loading position and an injection position, as illustrated in FIGS. 2B1-2B2 and 2C1-2C2, respectively.

The mold-mounting assembly 54 includes an upper or first mold-mounting device 64 and a lower or second mold-mounting device 66 for selectively mounting the upper and lower mold pallet units 56, 58 to the upper and lower supports 60, 62, respectively. The upper and lower mold-mounting devices 64, 66 are secured to their respective upper and lower supports 60, 62, and are both movable between a mold-mounting condition and a mold-receiving/releasing condition. When the mold-mounting devices 64, 66 are in mold-mounting condition, engagement of the mold pallet units 56, 58 with the devices secures the units to their respective supports 60, 62. When the mold-mounting devices 64, 66 are in the mold-receiving/releasing condition, the corresponding mold pallet unit 56, 58 may be received by, or released from secured engagement with its respective support 60, 62.

In an initial stage of the molding process the lower support 62 is situated in the unloading/loading position. In this position, the mold pallet assembly 50 is in the open condition whereby the mold pallet units 56, 58 are vertically aligned, but separated from one another, as shown in FIG. 1. In this condition any necessary pre-injection treatment of the pallet units 56, 58 may be performed, such as coating the units or positioning an insert to be molded or embedded in the molded product M. The lower support 62 would then be moved from the unloading/loading position to the injection position. In this position, the mold pallet assembly 50 would be placed in a closed condition. When the mold pallet assembly 50 is in the closed condition, the mold pallet units 56 and 58 are in sealed engagement and cooperate to form a mold cavity 59 having the desired mold profile.

Once the mold pallet assembly 50 is closed and the mold cavity 59 is formed, the injection assembly 38 injects the injection material into the mold cavity 59. During, and after injection, the press assembly 52 supplies the clamping force necessary for partial or complete curing of the molded product, as may be desired. Pressure sensors 51 are provided within the press assembly 52 which are electrically interconnected with the control system. In the event the desired and proper pressure is not maintained, the control system may be provided with an alarm which sounds upon an attempt to further operate the machine at an improper pressure. In the preferred embodiment, safety switches are also provided which prevent operation of the machine at temperature and pressure levels which are not in accordance with the desired, programmed parameters.

Once the injection and curing stages of the molding process are completed, the press assembly 52 returns to the unloading/loading position, such that the mold pallet assembly 50 returns to the open condition. The molded product may then be unloaded from the mold pallet assembly 50. Necessary pretreatment of the pallet units 56, 58 may then be performed in advance of the next injection. In the event the injection molding machine 20 is to be used to manufacture an entirely different molded product or different "batch" having a different mold profile, the mold pallet assembly 50 may be readily replaced with an alternate mold pallet assembly 50'.

A typical operational sequence for production of a first batch of products by the injection molding machine 20 includes mold-installation, injection molding, and mold-removal. Production of a second batch of products having a different injection material requires an additional material change operation phase. During the mold installation phase, the first mold pallet assembly 50, defining a mold cavity 59 having a first mold profile, is placed and secured within the molding station of the machine 20. Once this phase is completed, the injection molding phase may begin, and the desired individual, or batches of molded product are produced. After the desired number of such molded products have been created during one or many injection processes, mold-removal may be initiated to remove the first mold pallet assembly 50 from the machine. The mold-installation and injection molding phases may then be repeated using a second mold pallet assembly 50' having a second, different mold profile, to produce a second individual or batch of molded product.

For ease of explanation, the arrangement of the injection molding machine 20, shown in schematic FIGS. 2A1 and 2A2, may be designated as a starting point of the mold-installation phase. At this starting point, the lower support 62 is situated at the unloading/loading position and the upper and lower mold-mounting devices 64 and 66 are in the mold-receiving/releasing condition. The mold pallet assembly 50 is positioned in a closed condition on a mold transport 70. The mold transport 70 is a rolling table with a top surface approximately coplaner with the lower support 62 in the unloading/loading position. The mold pallet assembly 50 includes alignment members 110 which ensure correct alignment of the first and second mold pallet units 56, 58 when in the closed condition forming the mold cavity 59.

In the next stages of mold-installation, the mold pallet assembly 50 is engaged with the lower support 62 and properly and precisely aligned thereon, as shown in FIGS. 2B1 and 2B2, for engagement with the injection assembly 38. The alignment members 110 ensure that the second mold pallet unit 58 is properly aligned in position relative to the first mold pallet unit 56 for the injection phase. Position sensors are provided as described herein to ensure that the mold pallet assembly 50 is properly aligned in position on the lower support 62. Programming of the control system 10 for injection molding of the desired mold pallet assembly 50 provided to the injection station 33 is also conducted as this stage by the methods described below.

Once the mold pallet assembly 50 is properly positioned and the control system programming initiated, the lower support 62 is then moved from the unloading-/loading position to the injection position. Each movement of the lower support 62 or other operation resulting in movement of the supports 60, 62, mold pallet assembly 50 or mold pallet units 54, 56, requires a manual operation by the operator using the lift controls 15. As shown in FIG. 1, the lift controls 15 comprise two operating buttons which must be simultaneously depressed by the operator before the desired apparatus, as indicated and controlled by the control system, may be moved. Requiring simultaneous operation of both buttons to move these components, avoids contact between the operator's hands and moving components of the machine 20, because both hands must be on the lift control buttons for operation.

In the injection position, illustrated in FIGS. 2C1 and 2C2, the first mold pallet unit 56 is positioned adjacent the upper support 60 and the upper mold-mounting device 64. Additionally, the first mold pallet unit 56, engages the injection assembly 38. The upper and lower mold-mounting devices 64, 66 may then be activated to a mold-mounting condition whereby the first and second mold pallet units 56, 58 are secured to the upper and lower supports 60, 62, respectively.

The lower support 62 may then be moved from the injection position to the unloading/loading position, as shown in FIGS. 2D1 and 2D2. The first mold pallet unit 56, which is secured to the upper support 60, remains stationary during this movement. The second mold pallet unit 58, which is secured to the lower support 62, moves with the lower support.

At this point in the operation sequence where the mold pallet units are separated and a new material is being used for the next batch of molded products, a pre-shot of injection material is injected through the first mold pallet unit 56 in preparation for the injection molding phase. Likewise, any necessary pre-treatment of the mold pallet units 56, 58 is performed at this stage, in advance of the injection operation.

Once the pre-shot and pre-treatments are completed, the injection molding phase may begin. In the preferred embodiment, an automatic cycle is initiated via the control system to repeat the desired number of pretreatment and injection operations to complete the batch of molded products. Upon initiation of the injection operation, the mold pallet assembly 50 is mounted to the press assembly 52 in unloading/loading position using the mold-mounting assembly 54 as previously described. The press assembly is then operated to vertically raise the second mold pallet unit 58 into engagement with the first mold pallet unit 56, which is engaged with the injection assembly 38. The injection assembly then operates to inject the desired material supplied by the supply assembly into the mold cavity 59. The mold pallet assembly 50 then remains clamped within the press assembly 52 for a time sufficient to cure or initiate curing of the molded product. During the cure time, the injection assembly 38 is recharged with molding material.

After injection, curing and recharging are completed, the press assembly is operated to vertically lower the second mold pallet unit 58 and lower support 62 to unloading/loading position. In this position, the molded product is removed and the pallet units are again pretreated as may be necessary for a second injection as previously described, or released from engagement with the press assembly for replacement with an alternate mold pallet assembly 50'.

Once the desired quantity of the first batch of molded products has been created, the mold-removal phase may be initiated to remove the first mold pallet assembly 50 from the machine 20. To initiate an automatic mold change operation, the operator may indicate on the control panel 12 that a mold change is desired, and the control system then initiates instructions as set forth herein to the operator. The lower support 62 is first moved to the injection position, in which the mold pallet assembly 50 is in the closed condition. The mold-mounting units 64 and 66 are then deactivated or moved to the mold-receiving/releasing condition. In this condition, the lower support 62 may be lowered to the unloading/loading position as shown in FIGS. 2E and 2F.

The mold pallet assembly 50 is then shifted from the lower support 62 to the mold transport 70 as originally shown in FIG. 2A1, and transported to a suitable storage location. Removal and/or installation of a mold pallet assembly from the lower support 62, and removal of waste strips of material, must be acknowledged to the control system by the operator using the control panel, in order to continue operation of the machine.

If another batch of molded products of a different mold profile are desired, the installation and injection molding phases may be repeated on a second mold pallet assembly 50' as shown in FIG. 2H1. In the event the operating parameters provided to the control system concerning the specifications for injection molding using second mold pallet assembly 50' require an injection material different from the material used in the first batch, the material change operation is performed. The material change operation initiated by the control system is an automatic material purge. Once the injection assembly 38 purges the prior injection material, and the old material is removed from the machine, the mold-installation phase may begin.

The first and second mold pallet units 56, 58 are best illustrated in FIG. 3. The first mold pallet unit 56 remains stationary through the injection molding phase. The unit 56 includes an engagement plate 80 engaged with the upper support 60. The engagement plate 80 has side surfaces 80a and an engagement surface 80b.

The first mold pallet unit 56 also includes an intermediate plate 82 which is coupled to the engagement plate 80, via a dowel pin 84 and conventional fasteners (not shown). The intermediate plate 82 is smaller than the engagement plate 80 and is positioned centrally relative thereto. A mounting-surface 86 is formed on the portion of the engagement surface 80b surrounding the intermediate plate 82, where the first mold pallet unit 56 is engaged by the upper mold-mounting device 64. The first mold pallet unit 56 further includes a mold-profile member 88 which defines an upper half of the mold cavity 59.

The second mold pallet unit 58 has a substantially similar configuration and includes a second engagement plate 90 having side surfaces edges 90a and an engagement surface 90b, and a second intermediate plate 92 coupled thereto by a dowel pin 94 and conventional fasteners (not shown). A mounting-surface 96, is formed on the portion of the second engagement surface 90b surrounding the second engagement plate 90 and the second intermediate plate 92, where second mold pallet unit 58 is engaged by the lower mold-mounting device 66. The second mold pallet unit 58 further includes a mold-profile member 98 which defines the lower half of the mold cavity.

As shown in FIG. 3, the first mold pallet unit 56 additionally includes a central opening 99 which extends through the engagement plate 80, the intermediate plate 82, and the mold-profile member 88. The central opening 99 includes a central axis 99a, along which the plates 80, 82 and profile member 88 are aligned. A nozzle-extension member 100 having a tapered passageway 102 for engagement with the injection nozzle unit 40, sealingly engages the central opening 99. When the mold pallet units 56 and 58 are in closed condition as shown in FIG. 3, the tapered passageway 102 extends between the mold cavity 59 and a top surface 80c of the engagement plate 80. In this condition, the passageway 102 forms a continuation of the injection passageway 44. Injection material may thus be injected from the injection assembly 38 via the injection nozzle unit 46 and nozzle-extension member 100 into the mold cavity 59.

The first mold pallet unit 56 further includes a guide ring which is indicated generally at 104. The guide ring 104 surrounds the portion of the nozzle-extension member 100 which is substantially co-planer with the top surface 80c of the engagement plate 80. The ring 104 is coupled to the engagement plate 80 by suitable fasteners 105, 106. The portion of the guide ring 104 spaced from the top surface 80c is beveled such that the ring has an outer register diameter 104a and an inner chamber, or lead, diameter 104b. The guide ring 104 performs final alignment and positioning of the first mold pallet unit 56 and the injection nozzle unit 40 of the injection assembly 38, as well as the press assembly 52, and/or the mold-mounting assembly 54.

The mold pallet assembly 50 includes alignment members 110 which ensure correct alignment between the first and second mold pallet units 56 and 58 in closed condition. In the illustrated embodiment, the alignment members are dowel alignment pins. The pins 110 are permanently secured in press fit engagement within appropriately sized openings 111 in the first mold pallet unit 56 such that approximately half of each pin projects outwardly therefrom. The projecting portion of the pins 110 are received in larger diameter sized openings 111a in the second mold pallet unit 58 when the units are placed in closed condition. Alternatively, the alignment pins 110 may be designed so that they are removable during certain stages of the machine operational sequence.

As previously explained, the press assembly 52 includes a upper support 60 and a lower support 62. The upper support 60 is secured to horizontal plate 32 and remains stationary throughout the injection molding process. The upper support includes a heating plate 120 and an insulation plate 122. The plates 32, 120, and 122 are secured together as with conventional fasteners 126 and 128. The heating plate 120 includes electrical heating elements 121 within the plate to assist with control of the temperature of the mold pallet assembly 50 during injection. Temperature sensors 121a are also provided within the heating plate, and electrically interconnected with the control system to provide feedback control signals to the control system concerning the temperature of the heating plate. In the event the proper temperature is not maintained, the control system may be provided with an alarm which sounds upon an attempt to further operate the machine at an improper temperature, and a safety switch which prevents such operation.

The plates 122, 120 and 32 of the upper support 60 include aligned central openings 132, 134, and 136 in the heating plate 120, the insulation plate 122, and the horizontal plate 32, respectively. The openings 132, 134 and 136 together define an open cylinder having a diameter sized to surround the cylindrical injection housing 42 of the injection nozzle unit 40.

The injection nozzle unit 40 is preferably spring-loaded (not shown) and extends beyond the heating plate 120 in an unbiased state, such as is shown schematically in FIGS. 2A1 and 2A2 However, when the first mold pallet unit 56 is secured to the upper support 60 by the mold-mounting assembly 54, the injection nozzle unit 40 is biased upwardly, such that the injection nozzle 46 is flush with the top surface 80c of the engagement plate 80 as illustrated in FIG. 3. In this manner, the necessary interface between the first mold pallet unit 56 and the injection nozzle unit 40 is ensured.

The components of the lower support 62 are substantially similar to those of the first mold pallet unit 56, with the exception of the nozzle-extension member 100. More particularly, the lower support 62 is secured to the horizontal plate 34, and includes a heating plate 142, an insulation plate 144, and a base plate 146 which are joined together by suitable conventional fasteners 148 and 150. The heating plate 142 also includes electrical heating elements 121 within the plate to assist with control of the temperature of the mold pallet assembly 50 during injection. Temperature sensors 121a are also provided within the heating plate 142, electrically interconnected with the control system to provide the control and safety features as described above.

The lower support 62 of the press assembly 52 is adapted to vertically move the second mold pallet unit 58 and second mold-mounting assembly 66, into engagement with the upper support 62, first mold-mounting assembly 64 and first mold pallet unit 56. In the preferred embodiment of the invention, the lower support includes a vertical lift mechanism 63 engaged with the frame 29 and lower horizontal plate 34. The lift mechanism 63 comprises a conventional hydraulic cylinder which is movably engaged with the base plate 146 of the lower support 62 for vertical movement thereof into engagement with the upper support 60 and injection assembly 38.

Turning now to the mold-mounting assembly 54, the upper mold-mounting device 64 and lower mold-mounting device 66 are provided. The upper mold-mounting device 64 secures and properly aligns and engages the first mold pallet unit 56 with the upper support 60. As best shown in FIG. 3, a pair of support bars 200 which are attached, via beams 202, to the intermediate horizontal plate 32 and vertical plates 30. The first support bars 200 are positioned to border the side surfaces 80a of the engagement plate 80 of the pallet unit 56.

A pair of guide rails 204, are positioned between, and secured to, the support bars 200 and the heating plate 120 of the upper support 60. The guide rails 204 each include a tapered end 205 which, as is best seen in FIG. 3, surrounds the side surfaces 80a of the engagement plate 80. In the illustrated and preferred embodiment, the clearance between the guide rails 204 and the sides 80a is less than the difference between the register diameter 104a and the lead diameter 104b of the guide ring 104.

The upper mold-mounting device 64 further includes a first pair of clamping units which are indicated generally at 206. The clamping units 206 are conventional hydraulically actuated devices which couple the first mold pallet unit 56 to the upper support 60. To this end, each clamping unit 206 is positioned directly beneath a central portion of a support bar 200 and secured thereto. To engage the pallet unit, each clamping unit 206 actuates a clamping-pin 208, which extends from the clamping unit actuated by a clamping drive member 210.

When the clamping pins 208 are extended, as is shown in FIGS. 1 and 3, the pins engage the mounting-surface 86 of the first mold pallet unit 56 to place the upper mold-mounting device 64 in a mold-mounting condition. Conversely, when the clamping pins 208 are retracted by the drive member 210, they disengage the mounting-surface 86 to release the first mold pallet unit 56 from the upper support 60.

The upper mold-mounting device 64 further includes a pair of conventional hydraulic safety latch units which are indicated generally at 212 and are best shown in FIG. 1. The safety latch units 212 are also mounted on the support bars 200. The units 212 are positioned to cooperate with corners of the first mold pallet unit 56, or more specifically the mounting-surface 86. These units, while perhaps not necessary in some applications, may be provided to supplement the function of the clamping units 206 securing the first pallet unit 56 with the upper support 60. The units 212 each include a latching arm 214 which is interconnected with a locking screw 216. The locking screws 216 having a threaded portion 218 extend through appropriate openings (not shown) in the support bars 200.

The safety latch units 212 are shown in FIG. 1 in a locked condition in which latching arms 214 engage the mounting-surface 86 of the first mold pallet unit 56. During the mold installation and mold removal phases, the latching arms 214 are pivoted away from the first mold pallet unit 56 as is shown schematically in FIG. 2A2. Likewise, when the installation of the mold pallet unit is complete, the latching arms 214 are pivoted back under the unit and locked in place as shown in FIG. 1 and as shown schematically in FIG. 2C2. The safety latch units 212 are preferably designed so that a loss of electrical or hydraulic power will not significantly effect the clamping power of the units whereby the first mold pallet unit 56 will be safely retained in a secure position.

The lower mold-mounting device 66 secures and properly aligns and engages the second mold pallet unit 58 with the lower support 62. The lower mold-mounting device 66 includes support plates 230 which are attached to the lower support 62 in suitable manner, such as beams 231. A pair of guide rails 232 are positioned between, and secured to, the support plates 230 and the heating plate 142. The guide rails 232 are substantially similar to the guide rails 204 of the upper mold-mounting device 64 and each include a tapered end 233 which surrounds the side surfaces 90a of the second engagement plate 90. In the illustrated and preferred embodiment, the clearance between the guide rails 204 and the sides 90a is less than the difference between the register diameter 104a and the lead diameter 104b of the guide ring 104.

The lower mold-mounting device 66 further includes C-shaped positioners 234 which are best seen in FIG. 1. These C-shaped positioners 234 are situated and sized to cradle the back edge portion of the second mold pallet unit 58. A position-sensor 236 is situated on one of the C-shaped positioners 234 which is a standard electrical proximity switch.

The position-sensor 236 is designed to indicate contact with the second mold pallet unit 58 and send a corresponding signal to the control system display panel 13 once such contact is made. In this manner, an operator of the machine 20 may easily determine whether or not the second mold pallet unit 58 is correctly aligned within the injection station 33.

The position-sensor 236 is electrically connected to the display panel 13 of the control system which visually indicates that contact has been made. Additionally or alternatively, the position-sensor 236 electrically interconnected with the computer control system 10 provides additional feedback control signals to the computer control system. In the event proper contact is not made, the control system may be provided with an alarm which sounds upon an attempt to further operate the machine with the pallet unit in an improper position, and a safety switch which prevents such operation.

The lower mold-mounting device 66 further includes a pair of clamping units which are indicated generally at 240, and which are substantially similar to the clamping units 206 of the upper mold-mounting device 64. The clamping units 240 are conventional hydraulically actuated devices which couple the second mold pallet unit 58 to the lower support 62. Each clamping unit 240 is positioned above a central portion of the support plates 230 and secured thereto. To engage the pallet unit 58, each clamping unit 240 includes a clamping-pin 242 which extends from the clamping unit actuated by a drive member 244.

The extension and retraction of the clamping-pins 242 corresponds to the placement of the second mold-mounting device 66 in the mold-mounting condition and the mold-receiving/releasing condition, respectively. More specifically, when the clamping pins 244 are extended, as is shown in FIGS. 1 and 3, the second mold pallet unit 58 is secured to the lower support 62. Conversely, when the clamping pins 244 are retracted, the second mold pallet unit 58 is uncoupled and may be released from, the lower support 62.

In the preferred embodiment of the machine 20, the computer control system 10 is programmable to control all aspects of operation of the stock supply assembly, extruder assembly 36, injection assembly 38, mold pallet assembly 50, press assembly 52 and mold mounting assembly 54. By controlling actuation and operation of each component of the machine 20, the mold pallet assembly 50 is installed, injected and removed without operator intervention. The control system includes a main electric power supply (not illustrated) for the machine 20. Additionally, the hydraulic unit 14 which actuates the various components during operation of the machine 20 is a conventional closed loop flow-in valve system.

The programmable computer 11, including the operator control panel and display panel, enable programming of the machine and its components to predetermine desired settings and operating conditions embodiment, the system 10 includes a Mitsubishi A Series programmable controller which controls and sets all parameters of the machine 20 function, and a CincinnatiElectro System 4045 operator interface which enables activation or deactivation of an automatic cycle of the machine and stages within the automatic cycle. It should be understood that the computer control system may be any one of a number of commercial programmable systems and operator stations.

Prior to operation of the machine 20, the operating control parameters of the molded products to be manufactured are programmed into the control system 10. Such operating parameters may include, for example, the size of the item to be molded, the number of items to be molded per hour, the volume of material within the injection assembly 38, the extruder assembly 36 screw speed, material temperature, pressure and flow rate settings for the injection assembly 38, material cure times, injector assembly rates and recharge rates, injection pressure, and the desired temperatures and pressures to be monitored in the operating components, such as the clamping assembly and hydraulic unit 14.

Based on information provided to the control system 10 for each batch of products, and an automatic cycle is programmed to operate the machine 20 with minimal operator intervention. Alternatively, the programmable computer 11 and operator control panel 12 can be used to start, stop or change machine operating conditions and positions, as may be necessary.

In a still further alternate embodiment, a bar code reader 236a may form a part of the position-sensor 236 to provide information concerning the desired operating control parameters to be used by the machine and control system. Each of the different mold pallet assemblies used within a machine 20 may have the desired operational parameters for that assembly and desired molded product programmed into the control system 10. In a large manufacturing environment, the number of different mold pallet assemblies used may be as many as 100 or more.

Upon placement of a mold pallet assembly 50 having a bar code label thereon in its aligned position on the lower support 62, the bar code reader electronically scans the bar code label and identifies the particular mold pallet assembly 50. Once the mold pallet assembly 50 is identified, the programmed operational parameters within the control system 10 assigned to the particular assembly 50 identified are implemented. The use of such a bar code system saves valuable time during changing of a mold pallet assembly, since the operator need not spend additional time setting, calling up or programming the control system to the desired parameters.

The preferred form of the apparatus has been described above. However, with the present disclosure in mind it is believed that obvious alterations to the preferred embodiment, to achieve comparable features and advantages in other apparatus, will become apparent to those of ordinary skill in the art.

What is claimed is:

1. An injection molding machine for injecting molding material to form molded products comprising:

a machine frame, an injection assembly coupled with said frame, a press assembly also coupled with said frame, a mold-mounting assembly coupled with said press assembly, and a mold pallet assembly to be secured to said press assembly by said mold-mounting assembly;

said mold pallet assembly includes first and second mold pallet units which define a mold cavity when in a closed condition, and alignment members to ensure correct alignment between said first and second mold pallet units when in said closed condition;

said first mold pallet unit including an injection passageway assembly for engagement with said injection assembly and receiving molding material;

said mold-mounting assembly has first and second mold-mounting devices, each having a clamping unit for releasably securing said first and second mold pallet units to said press assembly to enable the quick release of the mold pallet units from the press assembly, and further includes a sensor which indicates the position of said mold pallet assembly relative to said press assembly; and said press assembly being adapted to move said first and second mold pallet units between said closed condition in which said first mold pallet unit engages said injection assembly and an open condition in which said units are separated from one another.

2. An injection molding machine as set forth in claim 1 wherein said press assembly includes a first support and a second support and said first and second mold-mounting devices are coupled to said first and second support, respectively.

3. An injection molding machine as set forth in claim 2 wherein said first support is stationary relative to said machine frame, and said first mold pallet unit is secured to said stationary first support by said first mold-mounting device clamping unit during operation, and said second support is movable relative to said machine frame and said second mold pallet unit is secured to said movable second support by said second mold-mounting device clamping unit during operation.

4. An injection molding machine as set forth in claim 3 wherein said sensor indicates the position of said second mold pallet unit relative to said second support.

5. An injection molding machine as set forth in claim 1 wherein said first and second mold pallet units each comprise an engagement plate for engaging their associated first or second support, an intermediate plate secured to said engagement plate and a mold-profile member, said mold-profile members of said first and second mold pallet units together form said mold cavity when in said closed position.

6. An injection molding machine as set forth in claim 5 wherein said first mold pallet unit injection passageway assembly includes:

a central opening extending through said engagement plate, said intermediate plate, and said mold-profile member of said first mold pallet unit;

a nozzle member engaged within said central opening and including a material passageway; and a guide ring surrounding said nozzle member and secured to said engagement plate aligning said guide ring for engagement of said injection assembly with said injection passageway assembly.

7. An injection molding machine as set forth in claim 1 wherein said alignment members are secured within and project from openings in said first or second mold pallet units, and said alignment members are received within openings formed in said other of said first or second mold pallet unit to properly align said mold pallet units secured with said press assembly by said first and second mold-mounting devices during engagement in the closed condition.

8. An injection molding machine as set forth in claim 3 wherein said first mold-mounting device includes guide rails to correctly position said first mold pallet unit relative to said first support.

9. An injection molding machine as set forth in claim 8 wherein said guide rails are dimensioned and arranged to provide a clearance between said first mold pallet unit and guide rails which is less than a width dimension of said guide ring.

10. An injection molding machine as set forth in claim 1 wherein each of said clamping units includes a clamping pin and a drive member for selectively actuating said clamping pin to place said first or second mold-mounting device in a mold-mounting condition and a mold-receiving/releasing condition, respectively.

11. An injection molding machine as set forth in claim 1 wherein said first mold-mounting device further comprises a safety latching unit to retain said first mold pallet unit engaged with said first support in the event of a loss of power to said clamping unit in said mold-mounting condition.

* * * * *